United States Patent [19]
Maxwell, Jr.

[11] Patent Number: 5,286,092
[45] Date of Patent: Feb. 15, 1994

[54] DECORATIVE WHEEL COVER FOR TRUCK WHEEL

[76] Inventor: Lewis Maxwell, Jr., 16132 Hartwell, Detroit, Mich. 48235

[21] Appl. No.: 942,751

[22] Filed: Sep. 9, 1992

Related U.S. Application Data

[63] Continuation-in-part of Ser. No. 650,304, Feb. 4, 1991, Pat. No. 5,152,584.

[51] Int. Cl.$^5$ .............................................. B60B 7/14
[52] U.S. Cl. ................................ 301/37.37; 301/37.1; 301/108.4
[58] Field of Search ................. 301/37.1, 37.26, 37.37, 301/37.42, 108.1, 108.3, 108.4

[56] References Cited

U.S. PATENT DOCUMENTS

| | | | |
|---|---|---|---|
| 3,432,206 | 3/1969 | Spisak | 301/37.26 |
| 4,240,670 | 12/1980 | Zorn et al. | 301/37.37 X |
| 4,632,465 | 12/1986 | Commings | 301/108.4 |
| 4,790,605 | 12/1988 | Stalter, Sr. | 301/37.26 |
| 4,895,415 | 1/1990 | Stay et al. | 301/37.37 |

FOREIGN PATENT DOCUMENTS 633632  2/1928  France ............................. 301/108.4

Primary Examiner—Russell D. Stormer
Attorney, Agent, or Firm—Gifford, Groh, Sprinkle, Patmore and Anderson

[57] ABSTRACT

A decorative wheel cover for the wheel of a truck. The center cap is provided with wings or other decorative embellishments and is affixed to the cover plate by tabs. The nuts have an annular groove are used for securing the wheel cover over the lug nuts mounting the wheel. The cover plate has a plurality of nut-shaped projections which, together with the securing nuts, are covered with finishing caps.

10 Claims, 1 Drawing Sheet

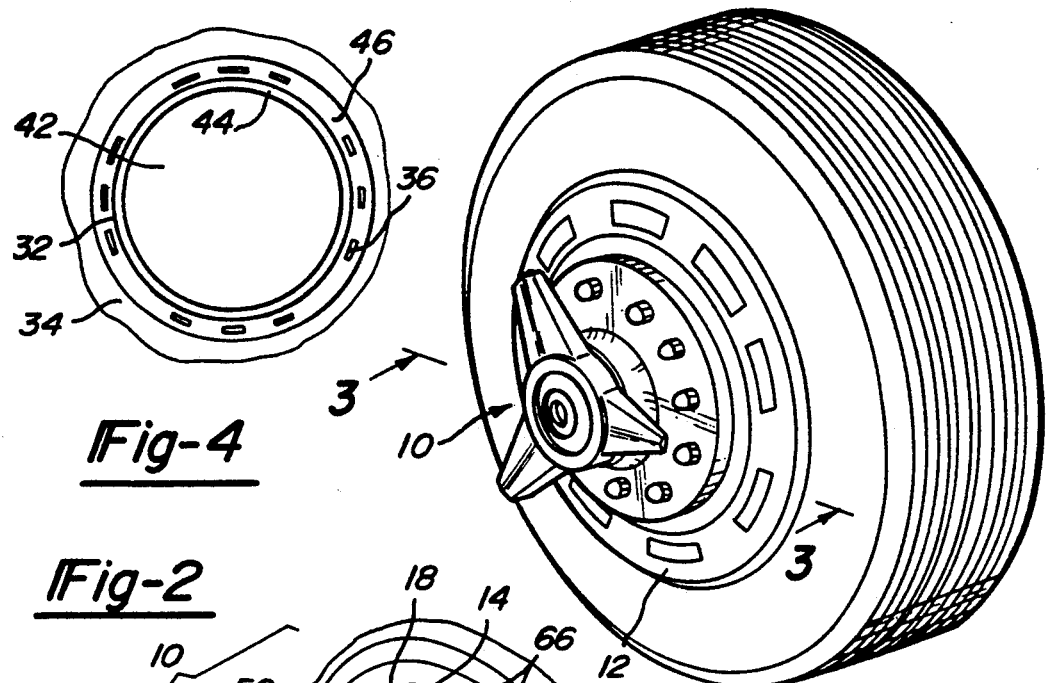
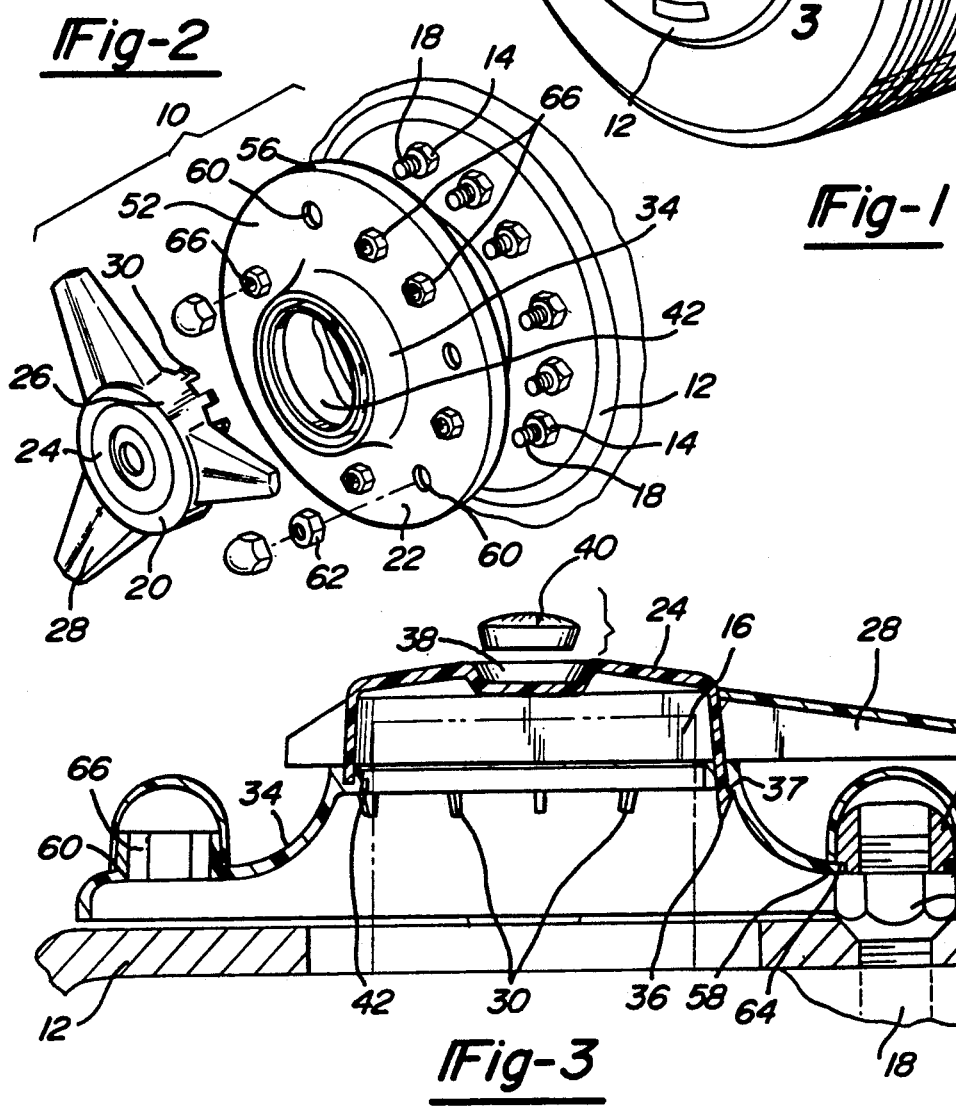

DECORATIVE WHEEL COVER FOR TRUCK WHEEL

This is a continuation-in-part of copending application(s) Ser. No. 07/650,304 filed on Feb. 4, 1991 now U.S. Pat. No. 5,152,584.

BACKGROUND OF THE INVENTION

I. Field of the Invention

The present invention relates to a decorative wheel cover for truck wheels.

II. Description of the Prior Art

Various types of wheel covers are known in the art. Of these known wheel covers, the majority are designed for use on passenger automobiles and the like. There has long been a desire to enhance and improve the ornamental appearance of trucks and other large vehicles. Passenger automobile wheel covers are not suitable for use on most trucks, due to differences in size. The existing covers for trucks also show a lacking of decorative appearance. Prior art wheel covers include, simulating a wire wheel with a knock-off for trucks, trailers, and the like.

U.S. Pat. No. 4,217,002 issued to Simpson, discloses a simulated wire wheel cover adapted to be mounted on the wheels of trucks, trailers, and the like. The wire covered disk of Simpson is adapted to be mounted onto a casting means of by mounting bores positioned at its outermost ends. An inner mounting flange separately attaches to the truck wheel in Simpson.

Other types of wheel covers for trucks are disclosed in U.S. Pat. No. 4,761,040, issued to Johnson, and U.S. Pat. No. 4,787,681, issued to Wang et al. Johnson discloses a hub extension for mounting a wheel cover. The wheel cover of Johnson mounts onto a plate member which is in turn mounted to an axial end portion by means of axially directed bolt and rod assemblies. Wang et al discloses a simulated custom wheel cover attachable to an automotive wheel by means of a number of lug nuts and decorative lug nut covers.

Finally, U.S. Pat. No. 4,462,639, issued to Holmstrom, discloses a wheel cover support pedestal having a cylindrical portion threaded to accept the wheel cover nut for mounting a wheel cover to the hub of a wheel. The wheel cover of Holmstrom provides a threaded cavity for threadably engaging an extended element of the wheel pedestal.

Therefore, it is a primary objective of the present invention to provide an ornamental truck wheel cover for a truck wheel. It is a further objective of the present invention to provide a cover which displays attractive and ornamental features.

SUMMARY OF THE PRESENT INVENTION

The present invention provides a decorative wheel cover which may be easily and securely attached to a wheel of a truck.

In brief, the wheel cover of the present invention includes a center cap mounted to a cover plate for mounting to a conventional truck wheel. The center cap is decorative and together with a neck portion of the cover plate extends over the end of the axle. The cover plate has a plurality of circumferentially spaced apertures in a precise circumferential alignment of accepting a like plurality of circumferentially spaced bolts. A plurality of hexagonal shaped projections extend outwardly from the cover plate to cover a portion of the bolts. A plurality of nuts with an annular groove engage the remaining bolts for mounting the cover plate to the wheel. Finish caps are mounted on the plurality of bolts and hexagonal projections.

BRIEF DESCRIPTION OF THE DRAWINGS

A better understanding of the present invention will be had upon reference to the following detailed description, when read in conjunction with the accompanying drawings, wherein like reference characters refer to like parts throughout the several views, and in which:

FIG. 1 is a perspective view of a wheel cover of the present invention in place on a track wheel;

FIG. 2 is an exploded view of the wheel cover of the present invention;

FIG. 3 is a sectional side view of the wheel cover in position on a wheel of a truck of the present invention; and FIG. 4 is a partial plan view of a neck of a cover plate of the wheel cover of the present invention.

DETAILED DESCRIPTION OF THE PREFERRED EMBODIMENT OF THE PRESENT INVENTION

Referring to FIGS. 1 and 2, the preferred embodiment of the wheel cover 10 of the present invention is thereshown. As shown in FIG. 2, the wheel cover includes a center cap 20 and a cover plate 22. The wheel cover is mounted upon a wheel 12.

The wheel 12 is mounted to the truck by a plurality of lug nuts 14 threaded on a plurality of bolts 18.

The center cap 20 has a center portion 24 and a cup-like flange 26 extending circumferentially from the center portion 24. The center cap 20 may be formed in any number of decorative shapes, however, in the preferred embodiment, three wings 28 or spinners extend radially outwardly from the flange 26. This embodiment presents the appearance of a knock-off hub. A plurality of tabs 30 extend axially from the flange 26 to engage slots 32 formed in a neck portion 34 of the cover plate 22, as shown in FIG. 4. Each of the tabs 30 is spaced circumferentially about the flange and has a wedge 36 having a shoulder 37 (FIG. 3) on an end. The tabs 30 are angled radially outwardly slightly so as to bias the wedge within the slot so that the shoulder 37 of the wedge prevents dislodgement of the center cap. A recess 38 is formed on the center portion 24 to receive a reflector 40 or other decorative member.

As shown in FIG. 3, the neck portion 34 of the center cap 22 extends outwardly from the wheel 12 and defines a central aperture 42 for receiving the axle end 16 of the wheel 12. As shown in FIG. 4, an annular flange 44 extends inwardly to define a channel 46 having the plurality of slots 32 for receiving the tabs 34.

The annular flange 44 extends axially within the neck to contact the wings 28 or other portion of the flange 26 to act with the shoulder 37 of the wedge to securely lock the center cap 20 in position on the neck portion of the cover plate. The neck portion 34 is joined to a flat disk portion 52 by a curved or sloped shoulder. A circumferential flange 56 extends from the disk portion 52 towards the wheel 12. The flange 56 extends a distance from an inner surface 58 of the cover plate slightly less than the axial length of the lug nuts 14. The cover plate thus covers a portion of the wheel 12 and the lug nuts 14.

Four throughbores 60 are circumferentially spaced in the disk portion 52 to accept four of the bolts 18. The cover plate 22 is received on the ends of the bolts 18 with the inner surface 58 of the cover plate 22 resting on the lug nuts 14. Four securing nuts 62 each having an annular groove 64 are threadably attached to a group of four bolts 64 of the plurality of bolts 18 to secure the cover plate to the truck. In order to speed the installation of the wheel cover, it is not necessary to place the securing nut on each bolt.

The annular groove 64 has a depth from an inner end face of the securing nut 62 generally equivalent to the thickness of the cover plate, so that when the securing nut is tightened on the bolt, the nut will not exert excessive pressure on the cover plate which could break or deform the plate.

Four pairs of nut-shaped projections 66 are formed to r extend outwardly from the cover plate between the throughbores Each projection 66 has a axial bore 68 positioned to receive the remaining or a second group of the plurality of bolts 18. The projections 66 are formed in the same shape and size as the securing nuts 62 so as to receive finish caps 70 formed of chromium or plastic having a chrome plating. The finish caps 70 cover the nuts and bolts to provide a finished appearance. The finish caps 70 have an interior aperture formed in the shape of a nut so as to mount by press fit on the securing nuts and projections 66.

In the preferred embodiment, the center cap and cover plate are formed of a rigid molded material such as plastic or fiberglass. However, it is within the contemplation of the invention to form the center cap and cover plate of a metal such as steel or aluminum. In the preferred embodiment, the molded material is chrome plated, as is known in the art, to provide a decorative appearance.

Having described my invention, many modifications thereto will become apparent to those skilled in the art to which it pertains without deviation from the spirit of the invention as defined by the scope of the appended claims. Different center caps may be formed for insertion on the mounting plate.

I claim:

1. A decorative wheel cover for a wheel of a truck, said truck having a plurality of bolts for mounting said wheel cover to said wheel with a plurality of securing nuts having at least one pair of opposed sides, said wheel cover comprising:
   a circular plate having a plurality of projections and a neck portion, said plurality of projections extending in a direction axially outwardly from said wheel, each of said projections having an aperture extending coaxially with a plurality of bores extending through said circular plate, said plurality of bores and said apertures of said projections adapted to receive respective ones of said plurality of bolts, each of said plurality of projections having at least two surfaces spaced apart a predetermined distance equal to the distance between said pair of opposed sides of said securing nuts;
   a cap mounted to said neck of said plate, said cap and said neck covering said axle portion of said truck; and
   means for mounting said cap to said neck portion of said center plate.

2. The wheel cover of claim 1, further comprising a plurality of finish caps having means for mounting to each of said securing nuts and said plurality of projections.

3. The wheel cover of claim 1, wherein said wheel of said truck is secured to said plurality of bolts by a plurality of lug nuts.

4. The wheel cover of claim 3, wherein an inside surface of said cover plate abuts said plurality of lug nuts when said wheel cover is mounted on said truck.

5. The wheel cover of claim 4, wherein said cover plate has a circumferential flange extending inwardly towards said wheel to cover said lug nuts.

6. The wheel cover of claim 1, wherein each of said securing nuts comprises an annular groove having a depth generally equal to a thickness of said cover plate.

7. The wheel cover of claim 1, wherein said center cap has at least one wing extending radially from said flange.

8. The wheel cover of claim 1, wherein said means for mounting said center cap further comprises a plurality of tabs extending from said flange.

9. The wheel cover of claim 8, wherein said neck portion comprises an annular flange defining an aperture and said neck portion has a plurality of slots for accepting said tabs of said center cap.

10. The wheel cover of claim 1, wherein said center cap has a reflector mounted to said cap.

* * * * *